US008812645B2

(12) United States Patent
Barsness et al.

(10) Patent No.: US 8,812,645 B2
(45) Date of Patent: *Aug. 19, 2014

(54) QUERY OPTIMIZATION IN A PARALLEL COMPUTER SYSTEM WITH MULTIPLE NETWORKS

(71) Applicant: International Business Machines Corporation, Armonk, NY (US)

(72) Inventors: Eric L. Barsness, Pine Island, MN (US); David L. Darrington, Rochester, MN (US); Amanda E. Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,390

(22) Filed: Mar. 5, 2013

(65) Prior Publication Data

US 2013/0185279 A1 Jul. 18, 2013

Related U.S. Application Data

(63) Continuation of application No. 11/834,816, filed on Aug. 7, 2007.

(51) Int. Cl.
*G06F 17/30* (2006.01)

(52) U.S. Cl.
USPC ........................................................ 709/223

(58) Field of Classification Search
USPC .................. 709/223–226; 370/255, 222, 217
See application file for complete search history.

(56) References Cited

U.S. PATENT DOCUMENTS

| | | | |
|---|---|---|---|
| 5,371,852 A | 12/1994 | Attanasio et al. | |
| 5,857,180 A | 1/1999 | Hallmark et al. | |
| 6,081,801 A | 6/2000 | Cochrane et al. | |
| 6,173,332 B1 | 1/2001 | Hickman | |
| 6,460,043 B1 | 10/2002 | Tabbara et al. | |
| 7,343,418 B2 | 3/2008 | Herley | |
| 2002/0143755 A1* | 10/2002 | Wynblatt et al. | 707/3 |
| 2002/0194173 A1 | 12/2002 | Bjornson et al. | |
| 2002/0198867 A1 | 12/2002 | Lohman et al. | |
| 2003/0037048 A1* | 2/2003 | Kabra et al. | 707/4 |

(Continued)

FOREIGN PATENT DOCUMENTS

JP 2002135330 A 5/2002

OTHER PUBLICATIONS

Eric L. Barsness et al, U.S. Appl. No. 12/127,077 "Utilizing Virtual Private Networks to Provide Object Level Security on a Multi-Node Computer System", filed May 27, 2008.

(Continued)

*Primary Examiner* — Thai Nguyen
(74) *Attorney, Agent, or Firm* — Martin & Associates, LLC; Bret J. Petersen

(57) ABSTRACT

A database query optimizer optimizes a query that uses multiple networks. The database query optimizer optimizes a query that uses multiple networks to satisfy the query by splitting the query execution to use multiple networks. Thus, the query optimizer rewrites or optimizes a query to execute on multiple nodes or networks to more efficiently execute the query and reduce network traffic on a network. The query optimizer uses plan cache statistics to determine whether to use multiple networks to optimize the query.

7 Claims, 6 Drawing Sheets

(56) References Cited

U.S. PATENT DOCUMENTS

| | | |
|---|---|---|
| 2005/0097078 A1 | 5/2005 | Lohman et al. |
| 2005/0165748 A1 | 7/2005 | Ting et al. |
| 2007/0053283 A1 | 3/2007 | Bidwell et al. |
| 2008/0028379 A1 | 1/2008 | Stichnoth |
| 2009/0089544 A1 | 4/2009 | Liu |

OTHER PUBLICATIONS

Eric L. Barsness et al., U.S. Appl. No. 11/834,816 "Query Optimization in a Parallel Computer System with Multiple Networks", filed Aug. 7, 2007.

Eric L. Barsness et al., U.S. Appl. No. 11/834,823 "Query Execution and Optimization with Autonomic Error Recovery from Network Failures in a Parallel Computer System with Multiple Networks", filed Aug. 7, 2007.

Eric L. Barsness et al., U.S. Appl. No. 11/834,827 "Query Execution and Optimization Utilizing a Combining Network in a Parallel Computer System", filed Aug. 7, 2007.

Eric L. Barsness et al., U.S. Appl. No. 11/861,343 "Inserting Data Into an In-Memory Distributed Nodal Database", filed Sep. 26, 2007.

Amsaleg et al., "Scrambling Query Plans to Cope with Unexpected Delays", Parallel and Distributed Information Systems, 1996, Fourth International Conference on Miami Beach, FL, USA Dec. 18-20, 1996, Los Alamitos, CA, USA, IEEE Computer Society, US, Dec. 18, 1996, pp. 208-219.

Knoblock, Craig A., "Planning, Executing, Sensing, and Replanning for Information Gathering", 1995, http://www.isi.edu/info-agents/papers/knoblock95-ijcal.pdf.

Ives et al., "An Adaptive Query Execution System for Data Integration", SIGMOD RECORD, ACM, New York, NY, US, vol. 28, No. 2, Jun. 1, 1998, pp. 299-310.

Getta, Janusz R., "Query Scrambling in Distributed Multidatabase Systems", Database and Expert Systems Applications, 2000, Proceedings of the 11th International Workshop on Sep. 4-8, 2000, Piscataway, NJ, USA, IEEE, Sep. 4, 2000, pp. 647-652.

Vossough et al., "Block Level Query Scrambling Algorithm Within Distributed Multi-Database Environment", Database adn Expert Systems Applications, 2001, Proceedings of the 12th International Workshop on Sep. 3-7, 2001, Piscataway, NJ, USA, IEEE< Sep. 3, 2001, pp. 123-127.

Google, Inc. "define topology—Google Search" Feb. 23, 2010, Google.com, p. 1-2.

Eric L. Barsness et al., U.S. Appl. No. 13/786,335 "Query Optimization in a Parallel Computer System to Reduce Network Traffic", filed Mar. 5, 2013.

Eric L. Barsness et al., U.S. Appl. No. 11/834,813 "Query Optimization in a Parallel Computer System to Reduce Network Traffic", filed Aug. 7, 2007.

Eric L. Barsness et al., U.S. Appl. No. 13/786,365 "Query Optimization in a Parallel Computer System to Reduce Network Traffic", filed Mar. 5, 2013.

\* cited by examiner

Network File

| Network ID | Timestamp | Util. | Future Util. | Availability | Latency | Retransmits | |
|---|---|---|---|---|---|---|---|
| NetworkA | 10:00:00 | 50% | 60% | Yes | 10ms | 1% | 410A |
| NetworkB | 10:00:00 | 10% | 10% | Yes | 30ms | 0.5% | 410B |
| NetworkC | 10:00:00 | 0% | 0% | No | 0ms | 0% | 410C |

Node Attribute Table

| Node Identification | Importance | Connects To | |
|---|---|---|---|
| Node1 | High | A, B, C | 510A |
| Node2 | Low | A, B, D | 510B |

Plan Cache Statistics 324
| Query ID | Execution Time | Nodes Involved List | Estimated # Bytes |
|---|---|---|---|
| QueryA | 1.3ms | Node1<br>Node2 | | 610A
| QueryB | 0.2ms | Node1<br>Node3<br>Node4 | | 610B
FIG. 6
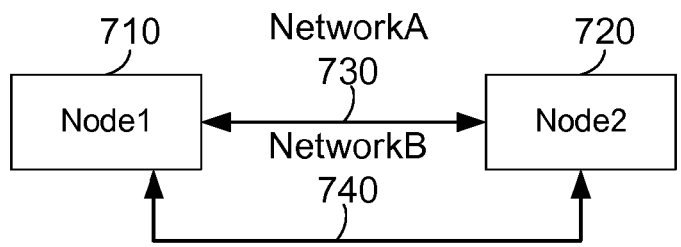
FIG. 7
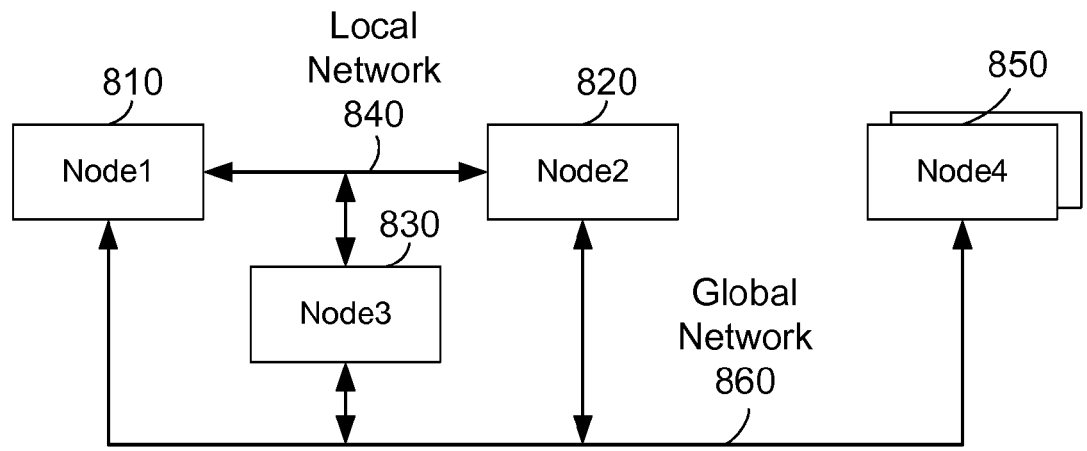
FIG. 8

US 8,812,645 B2

QUERY OPTIMIZATION IN A PARALLEL COMPUTER SYSTEM WITH MULTIPLE NETWORKS

CROSS-REFERENCE TO PARENT APPLICATION

This application is a continuation of U.S. Ser. No. 11/834,816 filed on Aug. 7, 2007, which is incorporated herein by reference.

BACKGROUND

1. Technical Field

This disclosure generally relates to database query optimizations, and more specifically relates to a query optimizer that rewrites a query to take advantage of multiple nodes and multiple network paths in a parallel computer system.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query.

Execution of a database query can be a resource-intensive and time-consuming process. A query optimizer is used in an effort to optimize queries to make better use of system resources. In order to prevent an excessive drain on resources, many databases are also configured with query governors. A query governor prevents the execution of large and resource-intensive queries by referencing a defined threshold. If the cost of executing a query exceeds the threshold, the query is not executed.

Many large institutional computer users are experiencing tremendous growth of their databases. One of the primary means of dealing with large databases is that of distributing the data across multiple partitions in a parallel computer system. The partitions can be logical or physical over which the data is distributed.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack. The Blue Gene/L supercomputer communicates over several communication networks. The compute nodes are arranged into both a logical tree network and a 3-dimensional torus network. The logical tree network connects the computational nodes so that each node communicates with a parent and one or two children. The torus network logically connects the compute nodes in a three-dimensional lattice like structure that allows each compute node to communicate with its closest 6 neighbors in a section of the computer.

Database query optimizers have been developed that evaluate queries and determine how to best execute the queries based on a number of different factors that affect query performance. However, none of the known query optimizers rewrite a query or optimize query execution for queries on multiple networks. On parallel computer systems in the prior art, the query optimizer is not able to effectively control the total use of resources across multiple nodes with one or more networks. Without a way to more effectively optimize queries, multiple network computer systems will continue to suffer from inefficient utilization of system resources to process database queries.

SUMMARY

In a networked computer system that includes multiple nodes and multiple networks interconnecting the nodes, a database query optimizer optimizes a query that uses multiple networks to satisfy the query. The query optimizer optimizes a query to split the query execution to use multiple networks. Thus, the query optimizer rewrites or optimizes a query to execute on multiple nodes or networks to more efficiently execute the query and to reduce network traffic on a network. The query optimizer uses plan cache statistics to determine whether to use multiple networks to optimize the query.

The disclosed examples herein are directed to a massively parallel computer system with multiple networks but the claims herein apply to any computer system with one or more networks and a number of parallel nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and:

FIG. 6 is a block diagram of a plan cache statistics file;

FIG. 7 is a block diagram of two nodes to illustrate an example of query optimization to reduce network traffic on a node or network;

FIG. 8 is a block diagram to show query optimization to reduce network traffic on a node or network according to the example of FIG. 7;

DETAILED DESCRIPTION

1.0 Overview

Figure 1:
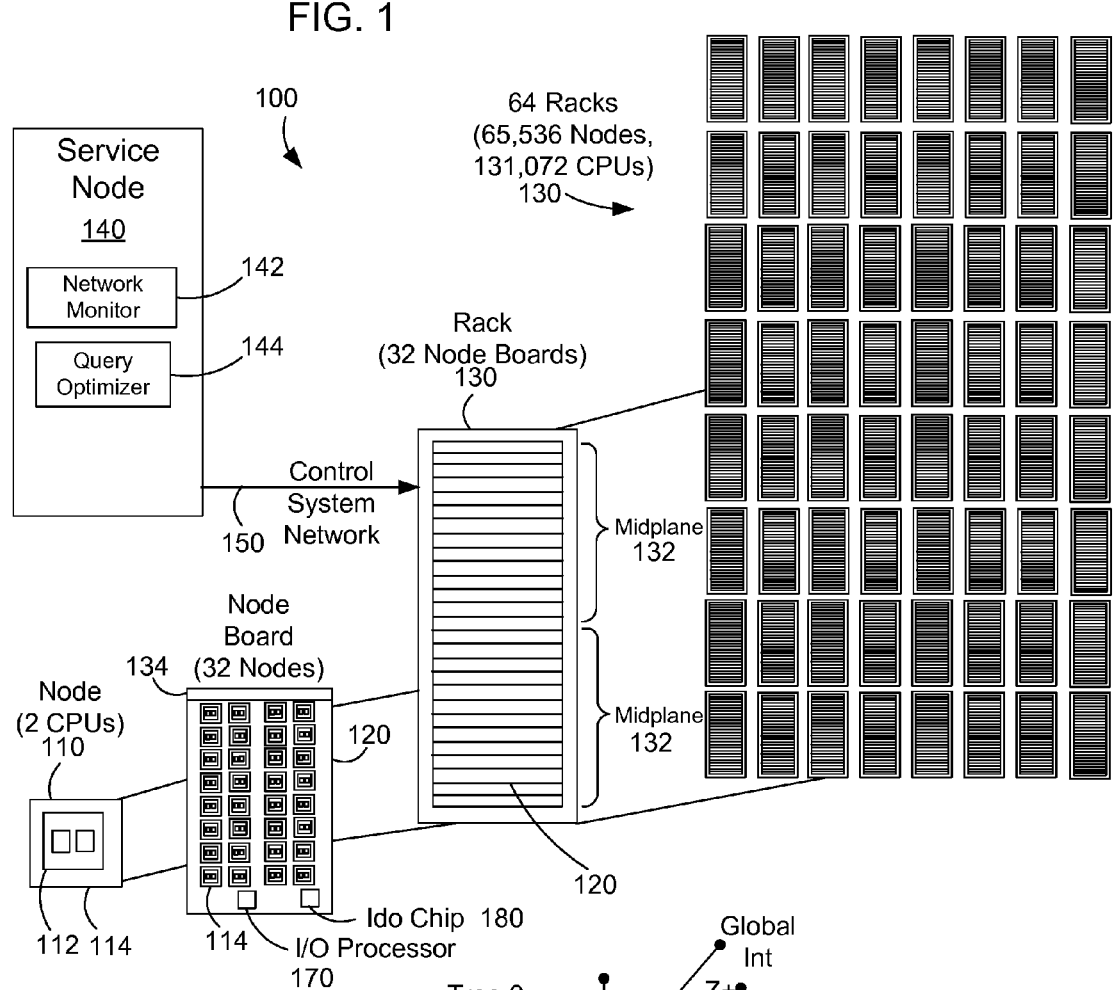
FIG. 1 is a block diagram of a computer with a query optimizer that rewrites a query to take advantage of multiple nodes and multiple network paths of a parallel computer system.

The disclosure and claims herein are related to query optimizers that develop and optimize how a query access a database. For those not familiar with databases, queries, and optimizers, this Overview section will provide additional background information.

Known Databases and Database Queries

There are many different types of databases known in the art. The most common one is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces an access plan to execute the query in the database. The access plan may be stored in a plan cache for use with subsequent queries that use the same access plan. In the prior art, a tool known as a query optimizer evaluates expressions in a query and optimizes the query and generates the access plan to access the database.

Query optimizers can also used to optimize queries in a parallel computer system. This application and claims are directed to a database query optimizer that uses multiple networks to satisfy a query in a networked computer system. The query optimizer optimizes a query to split the query execution to use multiple networks as describe further below.

2.0 Detailed Description

In a networked computer system that includes multiple nodes and multiple networks interconnecting the nodes, a database query optimizer optimizes a query that uses multiple networks to satisfy the query. The query optimizer rewrites or optimizes a query to execute on multiple nodes or networks to more efficiently execute the query and reduce network traffic on a network. The examples herein are directed to a query optimizer that executes on a massively parallel computer system such as a BlueGene supercomputer.

The BlueGene supercomputer family developed by IBM includes thousands of compute nodes coupled together via multiple different networks. In the BlueGene architecture, the torus and logical tree networks are independent networks, which means they do not share network resources such as links or packet injection FIFOs. When nodes are interconnected with different independent networks, as in the case of the BlueGene architecture, the use of one or more networks can affect the performance of database queries that include resources on one or more nodes and networks. A query optimizer can now take advantage of multiple networks when executing a database query. Known query optimizers take many things into consideration when optimizing a database query, but no known query optimizer has optimized queries by rewriting or optimizing the query to execute on multiple networks to optimize performance of a network and the query.

The detailed description is given with respect to the Blue Gene/L massively parallel computer being developed by International Business Machines Corporation (IBM). However, those skilled in the art will appreciate that the mechanisms and apparatus of the disclosure and claims apply equally to any parallel computer system with multiple nodes and networks.

FIG. 1 shows a block diagram that represents a massively parallel computer system 100 that incorporates many of the features in the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit Ethernet network (not shown). The gigabit Ethernet network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a network monitor 142. The node/network manager 142 comprises software in the service node and may include software in the nodes. The service node 140 further includes a query optimizer 144. The query optimizer 144 may execute on the service node and/or be loaded into the nodes. The node/network manager 142, and the query optimizer 144 are described more fully below. The invention described herein may be embodied as an article of manufacture comprising software stored on a non-transitory computer recordable media such as a CD-ROM.

Figure 2:
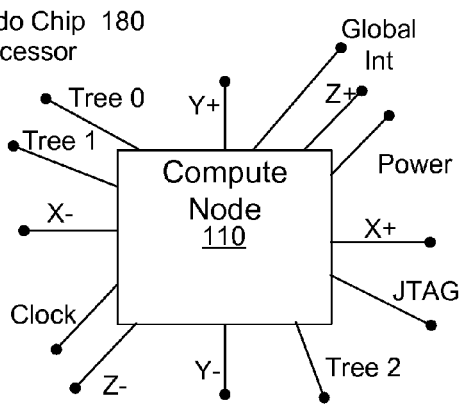
FIG. 2 is a block diagram of a compute node to illustrate the network connections to the compute node.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figures 3, 4, 5:
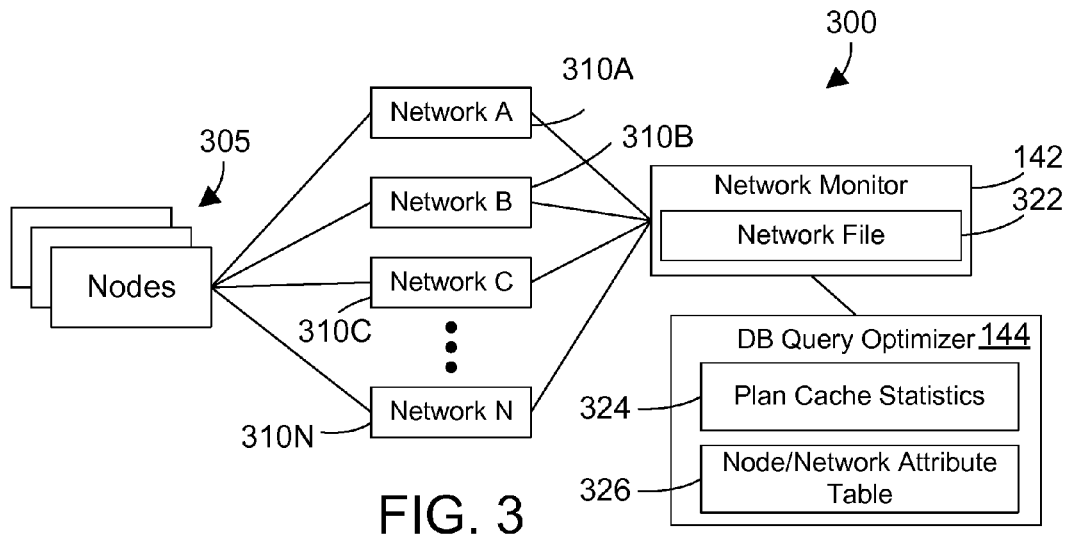
FIG. 3 is a block diagram representing a query optimizer system.
FIG. 4 is a block diagram of a network file record that contains information about network utilization.
FIG. 5 is a block diagram of node attribute table that contains node and network information that is set by a system administrator.

Referring to FIG. 3, a system 300 is shown to include multiple nodes 305 coupled together via multiple networks 310A, 310B, 310C, . . . , 310N. The system 300 represents a portion of the computer system 100 shown in FIG. 1. The multiple networks are also coupled to a network monitor 142 that monitors the networks and logs the network characteristics in a network file 322. The network monitor 142 provides input data to the query optimizer (or optimizer) 144. The query optimizer 144 includes a plan cache statistics file 324 that holds information regarding previously executed queries that can be used by the query optimizer. The query optimizer also includes a node attribute table 326 that is used to determine how to determine if a networks of a node are over loaded and whether the query can be re-optimized to execute over a different network. These information structures, the network file 322, the plane cache statistics file 324 and the node attribute table 326 are described more fully below. In the preferred implementation, the multiple networks are independent networks so a problem with one network does not affect the function of a different network. However, networks that dependent may also be used.

FIGS. 4, 5 and 6 illustrate information structures that store information that can be used by the query optimizer to determine how to optimize queries over multiple nodes and networks in a parallel computer database system. FIG. 4 illustrates a network file 322 that is used by the query optimizer. The network file 322 is maintained by the network monitor 142 (FIGS. 1, 3). Network file 322 preferably includes multiple records as needed to record status information about the networks in the computer system. The illustrated network file 322 has records 410A, 410B, and 410C. The network file records 410A through 410C contain information such as the network identifier (ID), a time stamp, current utilization, future utilization, network availability, latency and the percentage of retransmits. The current utilization represents how busy the network is in terms of bandwidth utilization at the time of the timestamp. Where possible, the future utilization of the network is predicted and stored. Similar to the node availability described above, the availability of the network indicates whether the network is available or not. Data stored in the network file 322 includes historical and real time information about the network status and loading.

FIG. 5 illustrates a node attribute table 326 that is used by the query optimizer. The node attribute table 326 is preferably setup by a system administrator using a graphical user interface (GUI). The node attribute table 326 contains multiple records that have status information about the nodes and networks in the computer system. In the illustrated example, the records 510A and 510B in the attribute table 326 contain information such as the node identification (ID), the importance of the node resource and the networks that are connected to the node. The query optimizer checks the node attribute table to determine whether a query can execute on a given network as described further below.

FIG. 6 illustrates a plan cache statistics table 324 that is used by the query optimizer. The plan cache statistics table 324 is preferably setup by the query optimizer and updated when queries are executed as described further below. The plan cache statistics table 324 contains multiple records that have execution performance metrics about queries executed on the computer database system. In the illustrated example, the records 610A and 610B in the attribute table 324 contain information such as query ID, the execution time of the query, the nodes involved list for the query, and the number of bytes needed to import/export to/from the node to execute the query. Thus, a record is stored for each query and each record may have multiple networks involved with that query.

FIG. 7 shows a block diagram of two nodes to illustrate an example of query optimization to split query execution to multiple networks. A first node, Node1 710, is connected to Node2 720 over a network 730. Node1 710, Node2 720, and network 730 represent nodes and networks in a parallel computer system such as the Blue Gene computer system shown in FIG. 1. We assume for this example that a QueryA (FIG. 6) on Node1 710 needs to access data on Node2 720. The query is first received by the optimizer in the normal manner. The query optimizer checks the plan cache statistics for information on the networks involved in the query. The query optimizer determines that the query can be split to multiple networks to optimize the query's performance. The query optimizer may make this determination based on the various data in the network file 322 and the cache plan statistics file 324. In this example the determination to split the query can be made by determining that if the query used only NetworkA it would increase NetworkA's utilization to 80%, causing a significant degradation in response times. Splitting the query to run across both NetworkA and NetworkB will allow NetworkA's utilization to remain low enough to avoid increased response times.

Again referring to FIG. 7, when the query optimizer determines the query cannot be split, the query optimizer will optimize the query in the normal manner. When the query optimizer determines the query can be split to multiple networks each network is checked to see it is available. Some of the query process is moved to another available network. The other network may be added to the list of networks involved (FIG. 6) for this query.

FIG. 8 shows a block diagram of compute nodes and networks to illustrate another example of query optimization to split query execution to use multiple networks. A first set of nodes, Node1 810, Node2 820, and Node3 830 are connected by a local network 830. Further, the first set of nodes and Node4 850 are connected on a global network 860. The nodes and networks in this example represent nodes and networks in a parallel computer system such as the Blue Gene computer system shown in FIG. 1. We assume for this example that a query on Node1 810 needs to access data on nodes Node2 820, Node3 830 and Node4 850. The query is first received by the optimizer in the normal manner. The query optimizer checks the plan cache statistics for information on the networks involved in the query. The query optimizer determines that the query can be split to multiple networks to optimize the query's performance. The determination is made because retrieving all of the data from the nodes using the global network would overwhelm the global network, causing significant response times on that network. Instead the query is split between the global and local network such that some or all of the data from nodes 2 and 3 come from the local network, reducing the impact to the global network.

Figure 9:
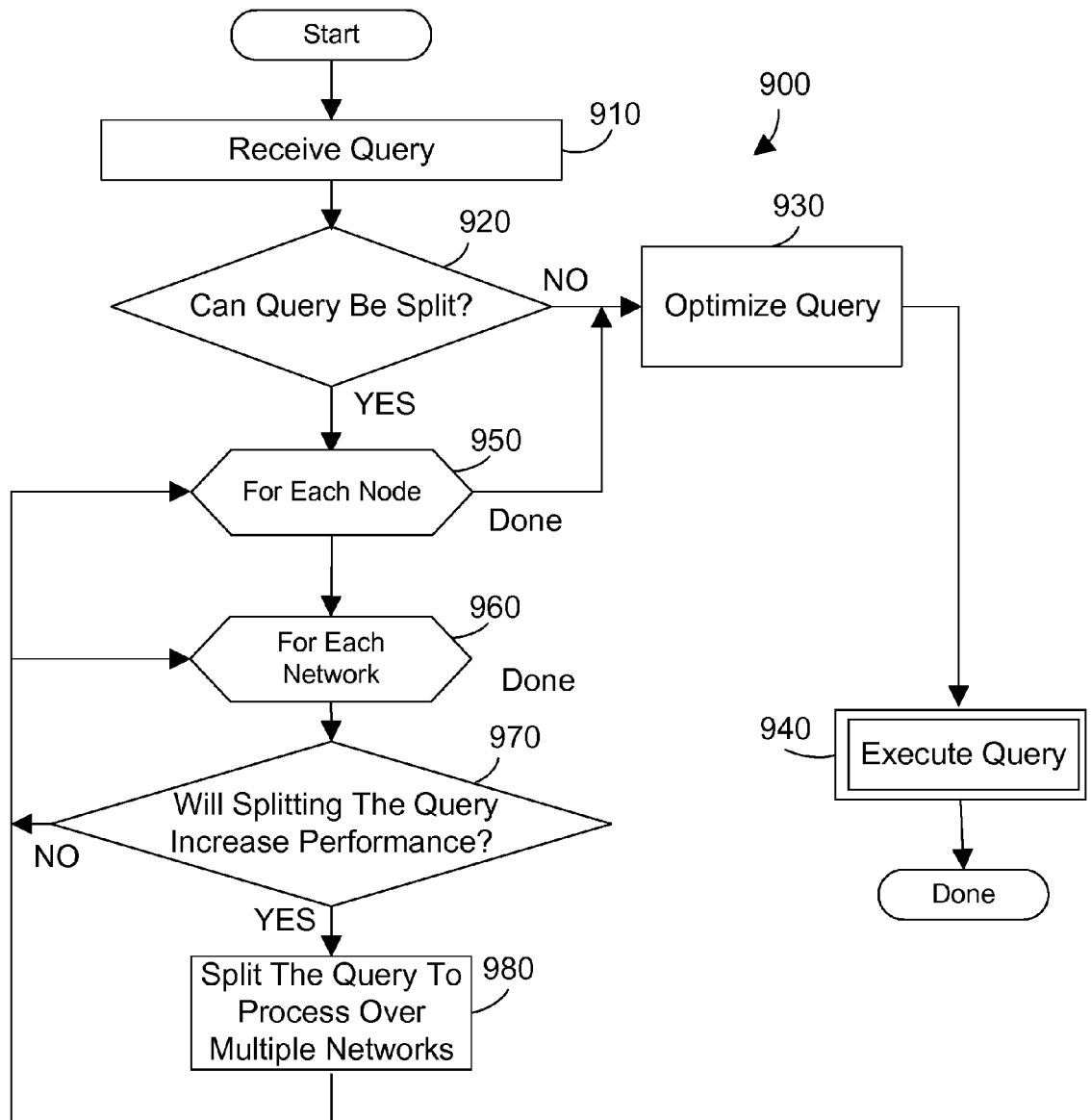
FIG. 9 is a method flow diagram for a query optimizer in a parallel database system.

FIG. 9 shows a method 900 for optimizing a computer database query with multiple nodes and multiple networks. The method 900 first receives a query (step 910). Next, check to see if the query can be split to optimize the query execution (step 920). If the query cannot be split (step 920=no) then optimize the query (step 930) and execute the query (step 940). Then the method is done. If the query can be split (step 920=yes) then process each node (step 950) and process each network for each node (step 960). After processing each network for a node then return to step 950 and process the next node. When all the nodes are completed, then go to step 930. If splitting the query will not increase the network performance (step 970=no) then process the next network (step 960). If splitting the network will increase performance (step 970=yes) then use the current network to split the query to process the query over multiple networks (step 980). The method could then process the remaining networks to find additional networks to use to split the query over multiple networks or the method could be done with this node. Similarly, all the nodes can be processed to find additional networks to split the query onto additional networks. When the nodes are all processed (step 960) then optimize the query (step 940) to use the multiple networks found in steps 950 through 980 and execute the query (step 950). Then the method is done.

Figure 10:
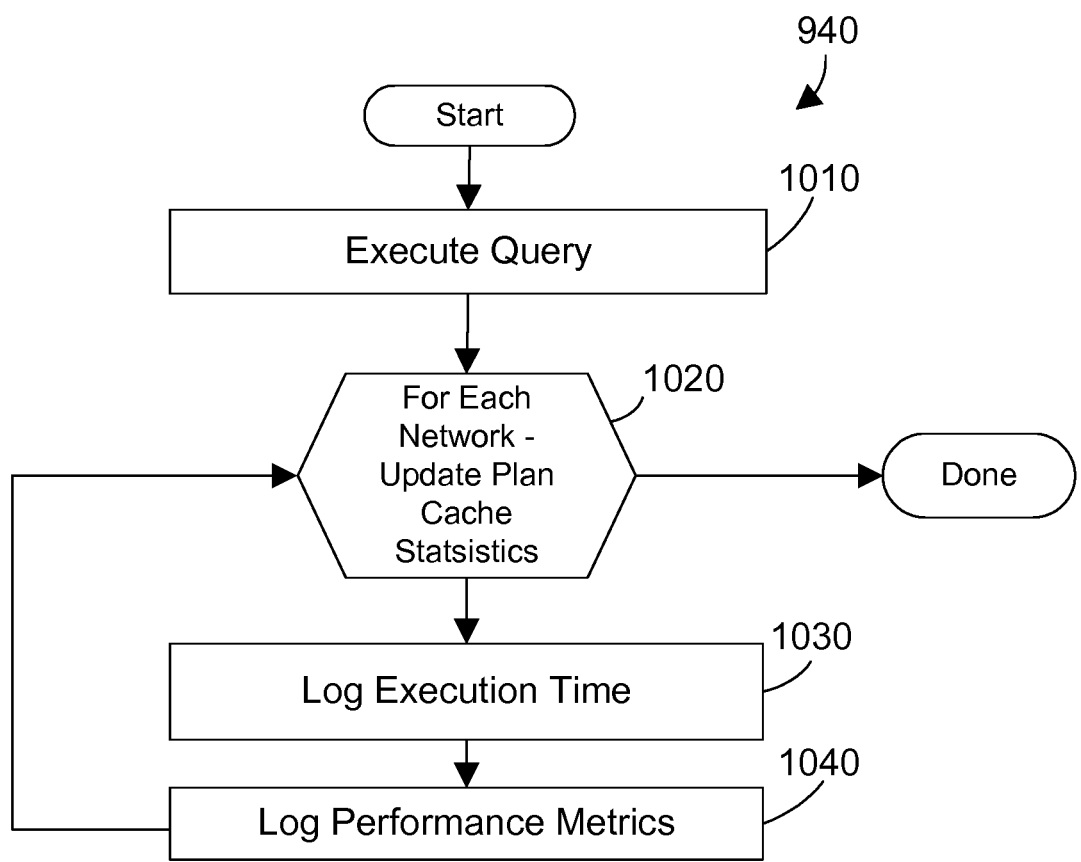
FIG. 10 is a method flow diagram that represents one possible implementation for step 940 in FIG. 9.

FIG. 10 shows a method 940 as one possible implementation for step 940 in FIG. 9. Method 940 illustrates a method for executing a query and obtaining execution information to assist in governing queries in a computer database. First, execute the query (step 1010) and collect the information and store it in the query file in the following steps. Next, for each network used in the query update the plan cache statistics (step 1020). Updating the plan cache statistics includes logging the execution time (step 1030), then logging the other query performance metrics that are desired (step 1040). When each of the network/nodes have been logged, the method is then done.

Figure 11:
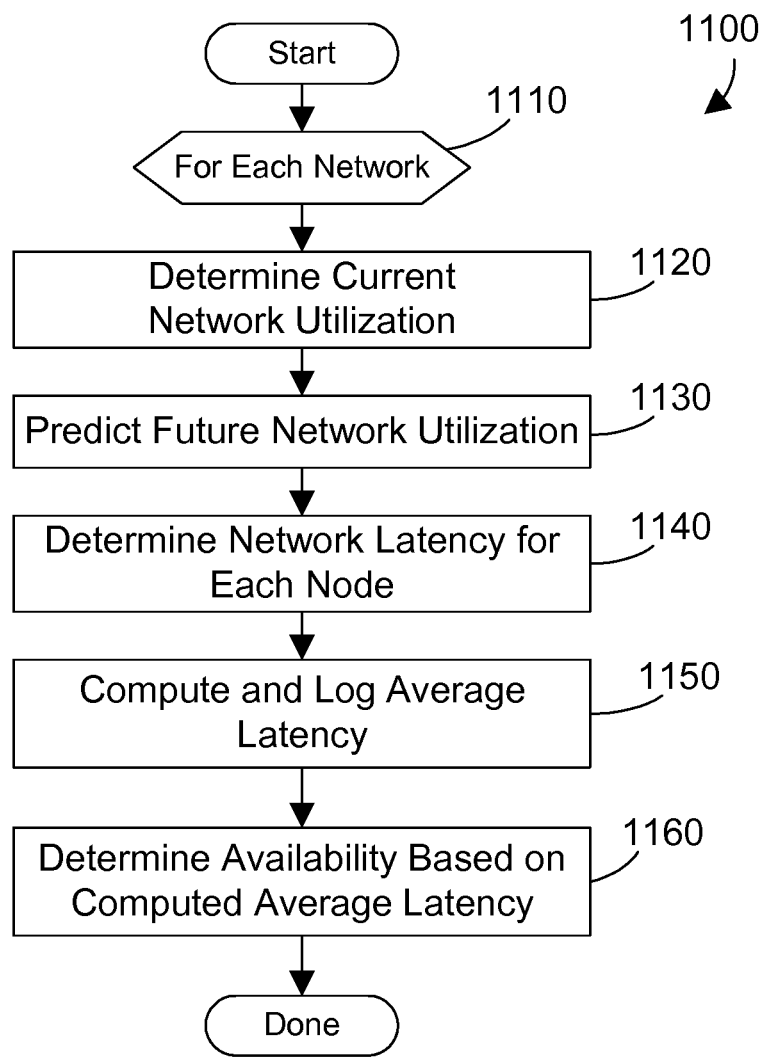
FIG. 11 is a method flow diagram to create network file records that are used by the query optimizer.

FIG. 11 shows a method 1100 for the network monitor 142 in FIGS. 1 and 3 to determine network traffic and network characteristics. The method may be executed on the compute nodes or on the service node 140 shown in FIG. 1. This method is executed for each network to govern database query activity in the database. For each network (step 1110), determine the current network utilization (step 1120). If possible, future network utilization is predicted (step 1130). Future network utilization could be predicted based on previous statistics stored in the network file. Predicted future network utilization could also be based on history if the application has been run before or has an identifiable pattern, and could be based on information provided about the application. For example, certain types of applications traditionally execute specific types of queries. Thus, financial applications might execute queries to specific nodes while scientific applications execute queries to all of the nodes. The network latency for each node is determined (step 1140). The average latency is computed and logged (step 1150). The availability of the network may then be determined based on the computed average latency (step 1160). For example, if the computed average latency exceeds some specified threshold level, the network would not be overloaded or not available, but if the computed average latency is less than or equal to the specified threshold level, the network would be available. Note that the determination of whether or not a network is Aavailable@ by the network monitor in step 1160 in FIG. 11 relates to whether the network is overloaded in step 970 in FIG. 9, and may be determined using any suitable heuristic or criteria.

Method 1100 in FIG. 11 may be performed at set time intervals so the network characteristics are constantly updated regardless of when they are used. Of course, in the alternative method 1100 could be performed on-demand when the network characteristics are needed. The benefit of doing method 1100 on-demand when the network characteristics are needed is the data will be as fresh as it can be. The downside of doing method 1100 on-demand when the network characteristics are needed is the delay that will be introduced by the network monitor 142 determining the network characteristics. Having the network monitor periodically gather the network characteristics means these characteristics are readily available anytime the query optimizer needs them. The period of the interval may be adjusted as needed to balance the performance of the system with concerns of the data being too stale.

The detailed description introduces a method and apparatus for a query optimizer to optimize queries by splitting the query execution to multiple networks in a parallel computer system. The query optimizer preferably uses plan cache statistics to determine whether to use multiple networks to optimize the query. The query optimizer allows a database query to better utilize system resources of a multiple network parallel computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer apparatus comprising:
   a plurality of nodes each having a memory and at least one processor;
   a database residing in the memory accessible by a query from a node of the plurality of nodes;
   a plurality of independent networks connecting the node of the plurality of nodes to the database; and
   a query optimizer residing in the memory and executed by the at least one processor, wherein the query optimizer creates an optimized query that splits the query to use multiple independent networks of the plurality of independent networks in executing the optimized query to access the database, and wherein the query optimizer uses plan cache statistics from previously executed queries to determine whether to use the multiple independent networks to optimize the query; wherein the plan cache statistics comprises: query identification (ID), execution time, nodes involved, and estimated number of bytes for the query; and wherein the query optimizer uses a network file containing network file information for the multiple independent networks comprising: network ID, a timestamp; current utilization, availability, latency, and retransmits.

2. The computer apparatus of claim 1 wherein the optimized query utilizes additional networks to increase communication speed to allow the query to execute faster.

3. The computer apparatus of claim 1 wherein the at least one of the plurality of networks would be overloaded by executing the query without using the additional networks.

4. The computer apparatus of claim 1 further comprising a service node connected to the plurality of nodes that controls the plurality of nodes, and a network monitor that periodically monitors the plurality of networks to determine network loading.

5. An article of manufacture for executing on a parallel computer system with a plurality of compute nodes comprising:

a query optimizer that creates an optimized query from a query to reduce network traffic over at least one of a plurality of independent networks connecting the plurality of compute nodes to a single database on the parallel computer system, wherein the query optimizer creates the optimized query by splitting the query to use multiple independent networks of a plurality of independent networks to access the single database, wherein the query optimizer uses plan cache statistics from previously executed queries to determine whether to use the multiple independent networks to optimize the query; and non-transitory computer recordable media on which computer instructions are stored, which instructions, when read by a computer, cause the computer to perform the steps of the query optimizer; wherein the plan cache statistics comprises: query identification (ID), execution time, nodes involved, and estimated number of bytes for the query; and wherein the query optimizer uses a network file containing network file information for the multiple independent networks comprising: network ID, a timestamp; current utilization, availability, latency, and retransmits.

6. The article of manufacture of claim 5 wherein the optimized query utilizes additional networks to increase communication speed to allow the query to execute faster.

7. The article of manufacture of claim 5 wherein the at least one of the plurality of networks would be overloaded by executing the query without using the additional networks.

* * * * *